United States Patent [19]

Travnicek

[11] 4,114,993
[45] Sep. 19, 1978

[54] FINISHED SILICONE CONTACT LENSES

[75] Inventor: Edward A. Travnicek, Southbridge, Mass.

[73] Assignee: American Optical Corporation, Southbridge, Mass.

[21] Appl. No.: 763,179

[22] Filed: Jan. 27, 1977

Related U.S. Application Data

[63] Continuation-in-part of Ser. No. 650,997, Jan. 21, 1976, abandoned.

[51] Int. Cl.² .............................................. G02C 7/04
[52] U.S. Cl. .................................... 351/160; 427/164
[58] Field of Search ........................... 351/160, 160 H

[56] References Cited

U.S. PATENT DOCUMENTS

| | | | |
|---|---|---|---|
| 3,036,985 | 5/1962 | Daudt | 351/160 X |
| 3,557,261 | 1/1971 | Wichterle | 351/160 X |
| 3,773,868 | 11/1973 | Bronstein | 351/161 X |
| 3,916,033 | 10/1975 | Merrill | 351/160 X |
| 3,959,105 | 5/1976 | Feneberg et al. | 351/160 X |

Primary Examiner—John K. Corbin
Attorney, Agent, or Firm—Jeremiah J. Duggan; Alan H. Spencer

[57] ABSTRACT

A method of finishing silicone lenses which avoids weakening, scratching or tearing the lens is disclosed and a filled silicone lens coated with an unfilled silicone elastomer is also disclosed.

2 Claims, No Drawings

FINISHED SILICONE CONTACT LENSES

This application is a continuation-in-part of my copending application Ser. No. 650,997, filed Jan. 21, 1976 and now abandoned, which was copending with application Ser. No. 666,591, filed Mar. 17, 1976, now U.S. Patent No. 3,996,189, which was a continuation-in-part of application Ser. No. 572,788, filed Apr. 29, 1975, now U.S. Patent No. 3,996,187.

Contact lenses, both hard and soft, are manufactured by casting or molding techniques producing a lens blank which must be subsequently machined to produce the final prescription lens having the proper lens surface. The technique of machining the soft contact lens blank, especially the cutting, grinding, and polishing of the lens, is such that a relatively smooth lens surface is difficult to obtain.

Conventional methods of edge finishing silicone lenses involve mechanical grinding. A number of procedures, grinding materials, and devices have been developed for edge finishing. These basically involve the mounting of the lens upon a chuck which rotates while either a cutting tool engages the edge of the lens to cut the lens to the desired shape, or a grinding tool rotating at high speed in opposite direction to the chuck, grinds the edge to the desired configuration.

These conventional methods all result in rather rough surfaces causing a great deal of rejection because of microtears or scratches on the lens. The various polishing techniques which have been developed are usually slow and not wholly satisfactory.

I have now found that it is possible to coat this rough, previously ground edge with a liquid which will fill the microtears and scratches and yet will not affect the optical properties of the lens.

The liquid coating should preferably be of the same or similar composition as the silicon lens; the ratio of phenyl to methyl groups in the coating liquid and the silicon lens should be similar for best adhesion and optical properties; the coating liquid should be easy to polymerize, cure or dry.

A wide range of transparent, low viscosity silicone liquids that cure to form rubber-like tough transparent solids may be used. Two such liquids, 615 and 655, have the following physical characteristics:

|  | RTV-615 | RTV-655 |
|---|---|---|
| Uncured |  |  |
| Viscosity | 40 Poises | 5000 centipoises |
| Specific gravity | 1.02 | 1.07 |
| Refractive Index at 20° C | 1.418 | 1.435 |
| Cured |  |  |
| Specific Gravity | 1.02 | 1.07 |
| Tensile strength (psi) | 925 | 850 – 1000 |
| ASTM-D-676 Durometer, *Shore A* | 35 | 35 |

Generally, a copolymer of an aryl siloxane and an alkyl siloxane containing about 12 mole percent of the aryl groups will have a refractive index which will substantially match that of a fume silica filler, making the elastomeric product transparent or substantially transparent. In one specific case, a copolymer of diphenyl siloxane and dimethyl siloxane containing about 12 mole percent of the diphenyl groups with a balance of dimethyl groups produces a product which will be essentially transparent with a fume silica filler. Also, a copolymer of phenyl-methyl siloxane (about 24 mole percent) with dimethyl siloxane produces a copolymer (containing about the same proportion of phenyl and methyl groups) product having a refractive index which will match that of the fume silica filler. Other co- or ter-polymers, containing the same proportion of phenyl and methyl groups will produce products which are transparent with the fume silica fillers. Minor variations in the composition of the polymers have a slight effect upon optical clarity.

Preferably, the contact lens includes:

A. A polymer of
  1. dimethyl siloxane,
  2. diphenyl siloxane or phenyl-methyl siloxane or both, and
  3. vinyl siloxane, which contains a small amount of platinum catalyst in solution;

B. A polymer of
  1. dimethyl siloxane,
  2. diphenyl siloxane or phenyl-methyl siloxane or both, and
  3. a siloxane having $(R)_2HSi-O-$ groups, or $-O-SiHR-O-$ groups or both, wherein R is methyl or ethyl, and preferably methyl; and C. 5 to 20% fume silica.

This preferred composition is substantially free of Si atoms which do not have an organo group bonded thereto.

The A and B polymers must each have 6 to 16 mole percent phenyl groups and each contain no Part 3 of the other. Since it is difficult to find a commercially available polymer having the proper percentage of phenyl groups to closely match the index of refraction of the filler, as well as having the other required properties, the index of refraction in the elastomer can be closely matched by selecting a mixture of polymers so that their blend has an index of refraction the same as the index of refraction of the filler. As noted above, care must be taken to avoid mixing polymers having widely differing amounts of phenyl groups. I have found that within the range of 6 to 16 mole percent phenyl the effect on transparency, due to unequal amounts of the phenyl groups, is not significant.

The selection of a catalyst is within the skill of the art. The prefered catalysts are organo platinum compounds such as those disclosed in U.S. Pat. Nos. 2,823,218 and 3,159,601. Many commercial silicone polymers useful in formulating the vulcanizate of the present invention contain catalytic amounts of such organo platinum compounds. Catalytic materials such as organotin compounds and amines should generally be avoided due to their known toxicity. Although not essential, it is preferable that the resulting vulcanized product be extracted to remove impurities, e.g., unreacted starting materials. Suitable solvents are, for example, aliphatic, aromatic or chlorinated hydrocarbons. These include, for example, hexane, toluene, methylene chloride, chloroform, and carbon tetrachloride.

EXAMPLE 1

A two-part silicone potting resin (General Electric RTV 615) was mixed with fume silica filler so that the final mixture contained 100 part of Part A, 10 parts of Part B and 11 parts of fume silica filler (all parts by weight). Part A of this resin is a copolymer of dimethyl siloxane and about 0.3 mole percent of a vinyl siloxane.

It also contains a catalytic amount of an organo platinum catalyst from a group known to the art. Part B of the above resin is a copolymer whose major component is dimethyl siloxane and about 1 to 2% of —O—SiH(CH$_3$)$_2$ units. When the part A and B components are mixed immediately prior to use, the platinum compound catalyzes a reaction between the vinyl and →SiH groups to form new chemical bonds and ultimately a cross-linked elastomeric mass.

The silica-filled mixture as described above was used to make contact lenses. It was found to have adequate strength but adequate optical clarity, even when in sections only 0.10 millimeters thick.

Dr. David Miller, in the Contact Lens Journal, April 1972, Page 38, described the use of this resin mixture for contact lenses.

EXAMPLE 2

A two-part silicon potting resin from General Electric known as RTV 655 was mixed with fume silica filler so that the final mixture contained 100 parts of Part A, 10 parts of Part B and 11 parts of fume silica filler (all parts by weight). Part A of this resin is a terpolymer of about 0.3 mole % of a vinyl siloxane, about 6 mole percent diphenyl siloxane and the remainder dimethyl siloxane. Part A also contains a catalytic amount of an organo platinum catalyst from a group known to the art. Part B of the above resin is a copolymer that contains about 1 to 2 mole percent —O—SiH(CH$_3$)$_2$ units, about 6 mole percent diphenyl siloxane and the remainder dimethyl siloxane units. When the Part A and B components are mixed immediately prior to use, the platinum compound catalyzes a reaction between the vinyl and →SiH groups to form new chemical bonds and ultimately a cross-linked elastomeric mass. The filler may be mixed with Parts A and B in any order. It is usually most convenient to mix the filler with the A component first and then to mix that mixture with the B component. This mixture was used to make contact lenses. It was found to have adequate strength and to have sufficient optical clarity to be useful for contact lenses. The haze of this filled material was barely measurable in sections less than 1mm thick and much less than that of the filled RTV 615 of Example 1.

These silicone coating materials may contain treated or untreated fume silica filler or no filler as desired depending upon the mechanical and other properties desired. Such compositions are known in the literature of silicone contact lenses.

Conventional volatile compatible solvent may be used to thin this coating liquid if desired, however it is not necessary.

The preferred method of application, because of its ease, is to coat the lens with the liquid while the lens is still mounted in the chuck and after it has been cut to its desired shape, the lens is then spun at moderate to high speed for a short time to enable excess liquid to flow off the edge. The speed and time to make a coating of the desired thickness may of course vary depending upon the conditions of manufacture, however a speed of 1000 to 30,000 RPM for 1 to 100 seconds is usually sufficient.

To cure this coating as quickly as possible, a stream of warm air with a controlled desired temperature may be directed at the freshly coated lens for a few seconds or minutes. The cure times for the 615 and 655 liquids are 60 seconds at 150° C or 6 seconds at 200° C. The curing lens should be rotating slowly (100 to 1000 RPM) while curing proceeds. Alternatively, the lens may be removed from its mandrel and cured in a hot air oven at a lower temperature for a longer period of time.

EXAMPLE 3

Contact lenses were cast using the procedure and composition of Example 2. These lens edges were then machined to the desired contour. Before the lenses were removed from the mandrel on which they were mounted during machining, the lens edges were lightly coated with unfilled diluted RTV-655 (100 parts A, 10 parts B, about 110 toluene) by daubing. The coated lenses were then spun at about 2000 RPM for several seconds to evenly distribute the coating and simultaneously jets of air were directed onto the lenses to assist the removal of excess liquid. The lenses, still on the mandrels, were oven cured at 90° C for 1 hour. Examination showed that the edges were acceptable for fitting to the human eye and that the roughness and tears from machining were substantially eliminated.

The lens treated in this manner also has the advantage that it may be placed in contact with a mold while curing and is thus capable of forming a precisely formed edge.

What is claimed is:

1. A silicone contact lens comprising a cured, filled, silicone substrate having machined surfaces and an evenly distributed, unfilled, subsequently cured silicone coating on the substrate, wherein the substrate comprises 80 to 95% by weight of
   a. a copolymer comprising
      i. dimethyl siloxane,
      ii. diphenyl siloxane, or phenylmethyl siloxane or mixtures thereof, and
      iii. vinyl siloxane;
   b. a copolymer comprising
      i. dimethyl siloxane
      ii. diphenyl siloxane or phenylmethyl siloxane or mixtures thereof, and
      iii. siloxane having (R)$_2$HSiO— or —O—SiH-R—O— groups, or both, wherein R is methyl or ethyl; with the proviso that each of fractions (a) and (b) has 6 to 16 mole percent phenyl and each contains no Part (iii) of the other;
   c. 5 to 20% of a silica filler, the refractive index of said copolymer being substantially the same as the index of refraction of (c) and the coating liquid consists of a vulcanized mixture of (a) and (b).

2. The contact lens of claim 1 wherein the substrate is a filled RTV 655 elastomer and the coating is an unfilled RTV 655 elastomer.

* * * * *

UNITED STATES PATENT AND TRADEMARK OFFICE
CERTIFICATE OF CORRECTION

PATENT NO. : 4,114,993

DATED : September 19, 1978

INVENTOR(S) : Edward A. Travnicek

It is certified that error appears in the above-identified patent and that said Letters Patent are hereby corrected as shown below:

Column 1, lines 37 and 39, the word "silicon" should read -- silicone --

Column 3, line 12, the word "adequate" should read -- inadequate --

Signed and Sealed this

Nineteenth Day of December 1978

[SEAL]

Attest:

RUTH C. MASON
Attesting Officer

DONALD W. BANNER
Commissioner of Patents and Trademarks